United States Patent [19]

Heskett

[11] Patent Number: 4,642,192
[45] Date of Patent: Feb. 10, 1987

[54] METHOD OF TREATING FLUIDS

[76] Inventor: Don E. Heskett, P.O. Box 243, Constantine, Mich. 49042

[21] Appl. No.: 859,610

[22] Filed: May 5, 1986

Related U.S. Application Data

[63] Continuation of Ser. No. 605,652, Apr. 30, 1984.

[51] Int. Cl.⁴ .......................... C02F 1/28; C02F 1/44; C02F 1/70; C02F 1/72
[52] U.S. Cl. .................................. 210/638; 210/663; 210/757; 210/758; 210/763; 210/903
[58] Field of Search ............... 210/638, 652, 663, 719, 210/720, 721, 722, 743, 754, 755, 756, 757, 758, 759, 760, 763, 903, 510.1

[56] References Cited

U.S. PATENT DOCUMENTS

| | | | |
|---|---|---|---|
| 1,428,618 | 9/1922 | Wagner | 210/757 |
| 2,554,343 | 5/1951 | Pall | 210/510.1 |
| 3,442,802 | 5/1969 | Hanilton | 210/763 |
| 3,617,579 | 11/1971 | Fuijikawa | 210/719 |
| 3,716,485 | 2/1973 | Robertson | 210/719 |
| 3,823,088 | 7/1974 | Box | 210/763 |
| 3,944,487 | 3/1976 | Davis | 210/763 |
| 4,219,419 | 8/1980 | Sweeney | 210/754 |
| 4,379,746 | 4/1983 | Norman | 210/757 |
| 4,382,865 | 5/1983 | Sweeney | 210/757 |
| 4,455,236 | 6/1984 | Kim | 210/721 |

FOREIGN PATENT DOCUMENTS

| | | | |
|---|---|---|---|
| 51-62184 | 5/1976 | Japan | 210/719 |
| 56-186694 | 10/1981 | Japan | 210/763 |
| 57-105287 | 6/1982 | Japan | 210/758 |
| 58-89987 | 5/1983 | Japan | 210/757 |
| 798050 | 1/1981 | U.S.S.R. | 210/757 |

OTHER PUBLICATIONS

Betz Handbook at Industrial Water Conditioning Betz Laboratories, 1976, Trevose, Pa., 38–40.
Hackh's Chemical Dictionary, McGraw Hill Book Co., 1969, p. 456.

*Primary Examiner*—Ernest G. Therkorn
*Attorney, Agent, or Firm*—Lockwood, Alex, Fitzgibbon & Cummings

[57] ABSTRACT

A method for treating fluid to remove undesirable constituents contained therein such as chlorine and nitrate constituents is disclosed. The method includes passing fluid containing the undesirable constituents through a bed of metal particulate matter. The metal particulate matter is preferably chosen from metals having favorable redox potentials relative to the redox potentials of the undesirable constituents so as to establish conditions for spontaneous oxidation and reduction reactions between the undesirable constituents and the metal particles.

11 Claims, No Drawings

METHOD OF TREATING FLUIDS

This is a continuation of co-pending application Ser. No. 605,652 filed Apr. 30, 1984.

BACKGROUND AND DESCRIPTION OF THE INVENTION

The present invention generally relates to fluid treating and, more particularly, to methods which are especially adapted for providing for improved treatment of fluids. Although capable of a variety of uses, this invention finds advantageous utility in the treatment of water to remove undesirable constituents contained therein such as, for example, dissolved chlorine and nitrates constituents.

In the field of fluid treating, and particularly in the field of treating water for commercial, industrial and domestic use, a number of systems have been proposed, some or all of which have certain undesirable characteristics, drawbacks or disadvantages associated therewith.

For example, ion-exchange systems are commonly used to soften water and selectively remove specific impurities from the water. The active medium of the ion-exchanger is an ion-exchange resin which is designed to remove undesirable constituents from the fluid and replace those undesirable constituents with a less undesirable constituent. For instance, a cation exchange resin employed to remove the hardness-producing elements of calcium and magnesium may be designed to simultaneously give up sodium in exchange for the calcium and magnesium contained in the water which has passed through the ion-exchanger. Regardless of the specific ion-exchange resin used, eventually the bed of resin becomes exhausted and the unit must be removed from service and be regenerated to become useful again. In addition to exhaustion the resin is also susceptible to chemical degradation. Accordingly, the ion-exchanger unit must be carefully maintained and monitored to assure continued acceptable performance.

Another popular type of process for treating water is reverse osmosis wherein pressure in excess of the osmotic pressure of the fluid is used to force untreated water, normally at ambient temperature, through a selective membrane in a direction opposite to that normally observed in osmotic processes. The selective membrane is designed to allow the water to permeate through while rejecting the dissolved undesirable constituents. The success of this process depends in large part upon the development of suitable membranes. Membranes utilized in reverse osmosis typically experience a variety of temperature, chemical and pressure stability problems as well as speed and capacity limitations. For example, water supplies are commonly treated with chlorine as an antibacterial agent. The dissolved chlorine, although highly effective in combating bacteria, often has a deleterious effect on reverse osmosis membranes. Additionally, reverse osmotic equipment also must be carefully set up, maintained, and monitored. Accordingly, regardless of the sophistication of the technology used, if the end user fails to maintain the system and perform the necessary sampling required to ensure that the system is functioning to design specifications a breakdown in treatment can occur.

Still another popular water treatment process is the application of activated carbon, which is widely used for taste and odor control as well as removal of organic contaminants from water by adsorbtion since activated carbon is characterized by a high adsorbtivity for gases, vapors, and colloidal solids. However, similiar to the resin in ion-exchangers, the adsorbtive capacity of the carbon is eventually depleted and the carbon either must be regenerated or replaced. Therefore a system incorporating activated carbon also requires careful monitoring to determine the effectiveness of the medium.

The present invention overcomes the undesirable characteristics, drawbacks and disadvantages of the prior art by providing a fluid treating method which employs metal particulate matter having a redox potential which relative to the redox potential of the undesirable constituents sought to be treated favors spontaneous oxidation-reduction reactions between the metal and the undesirable constituents. The metal particulate matter can be of varying mesh size, preferably of from 4 to 30 mesh based on U.S. Standard screen sizes, of any desired shape and is typically arranged in a loose bed confined within a treating tank by means which prevent the escape of the particulate matter but which, at the same time, permit fluid flow therethrough. Alternatively, techniques for adhering the particles into an aggregate porous body with the surface areas freely exposed can be utilized. Suitable techniques for forming such aggregate porous bodies include sintering and processes wherein a binder is utilized which results in all, or substantially all, of the surface area of the particles freely exposed for contacting fluids to be treated therewith. An important embodiment of the present invention is directed to a water treating method which employs metal particulate matter such as for example aluminum, iron, steel, zinc, and copper, as well as mixtures and alloys thereof, to provide removal of undesirable contaminants such as chlorine and nitrates. In this regard, an important aspect of the present invention involves a discovery that such a method will provide economical and long lasting removable of such undesirable contaminants and thereby greatly eliminate the weak link in most treatment systems i.e. maintaining and monitoring the system on a relatively frequent basis.

Another feature of the present invention involves a method of using such a bed of metal particulate matter in conjuntion with another type of fluid treating apparatus such as a reverse osmosis process or an ion-exchange process. In this regard, an important aspect of the present invention involves the removal of undesireable elements and compounds such as chlorine which may be detrimental to the operation and life of other treatment methods such as reverse osmosis and ion-exchange processes.

Another feature of the present invention involves adjusting the pH of the fluid and subsequently passing it through such a bed of metal particulate matter. In this regard, an important aspect of the present invention involves regulating the pH of the fluid prior to treatment to enhance the removal of contaminants having pH dependent oxidation-reduction activities.

Another feature of the present invention involves the conjoint use of dual containers having beds of such metal particulate matter arranged in series with a pH feeder interposed therebetween. Such a method of fluid treatment allows the user to take advantage of the pH of the source fluid at the inlet of the first container to treat the contaminants that are more responsive to treatment at the original source fluid pH and then to adjust the pH to treat contaminants which may be more effectively treated at another pH value to subsequently treat the fluid again in the second container.

It is therefore, an important object to the present invention to provide an improved fluid treating method.

Another object of the invention is to provide a fluid treating method which is economical to use, which has a relatively long life so as to avoid frequent maintenance and monitoring, and which eliminates the need to regenerate the treating medium and, accordingly, the need to dispose of concentrated contaminants inherent in other conventional treatment processes such as reverse osmosis and ion-exchange processes.

Another object of the invention is to provide a novel method of treating undesirable constituents such as chlorine and nitrates present in a fluid such as water without concentrating such constitutents in the treating medium.

Another object of the invention is to provide a fluid treating method which includes treating the fluid by passing the raw fluid containing undesirable constitutents through a bed of metallic particulate matter characterized by a redox potential which relative to the redox potential of the undesirable constituents sought to be treated establishes conditions for spontaneous oxidation and reduction reactions between the metal particulate matter and the undesirable constituents when the fluid is in contact with the metal particles.

Another object of the present invention is to provide an improved method of treating fluids wherein the fluids are first passed through a bed of metallic particulate matter to treat undesirable constituents present such as chlorine which may be harmful to a conventional fluid treatment process such as a reverse osmosis process or an ion-exchange process and to then pass the fluid through such a conventional treatment process.

These objects and other objects and advantages of the invention are accomplished by providing a method for treating fluid which includes passing fluid containing undesirable elements and compounds through a bed of metal particulate matter. The particulate matter is preferably chosen from metals such as aluminum, zinc, iron, steel, and copper as well as mixtures and alloys thereof, having favorable redox potentials relative to the undesirable constituents such as chlorine and nitrates sought to be treated so as to establish conditions for spontaneous oxidation and reduction reactions between the metal particulate matter and the undersirable constituents when the fluid is in contact with the metal particles.

Although an important aspect of the present invention is directed to the treatment of water especially drinking water, it will be appreciated that the method of this invention may also find advantageous utility in the treatment of a variety of other source fluids with various different undesirable contaminants. For purposes of illustration only therefore, this invention will, in most part, be described by reference to an embodiment wherein water is the source fluid being treated.

It has now been discovered that the composition of a given water supply can be altered with respect to certain contaminants therein such as dissolved chlorine and nitrates by bringing the water in contact with metals such as aluminum, iron, steel, zinc, and copper as well as mixtures and alloys thereof. For example, it has been noted that when water containing high concentrations of dissolved chlorine is passed through a canister housing metallic particulate matter such as brass that the detectable chlorine level of the effluent water is greatly reduced, if not totally eliminated.

It has further been discovered that such a method of fluid treatment is also effective under certain operating conditions to significantly reduce and/or eliminate the nitrate concentration of the effluent water. As a result of such findings, it is presumed that the present development may have widespread application to other types of inorganic contaminants such as hydrogen sulphide and sulphur dioxide to name but a few as well as organic contaminants.

Moreover, it is believed that the useful life of such a method of fluid treatment under normal operating conditions, would far exceed the useful life of other conventional treating systems. Accordingly, such a finding represents a considerable step forward in the art in that it helps to eliminate one of the major drawbacks of conventional systems, i.e. the need to frequently replenish the active source of treatment and the concomitant need to constantly maintain and monitor the system.

In addition such a method has wide spread potential application for a variety of domestic, commercial and industrial uses. For example noting that chlorine and iodine are effective anti-bacterial agents, drinking water, especially in a foreign locale, could be treated by initially chlorinating or iodizing the water and then the treated water could be transformed to a more palatable and safe form by passing the chlorinated or iodized water through a portable canister containing metal particles in accordance with the present invention.

As previously noted, this development is intended to have application to other fluid media besides water treatment including other liquid fluid media as well as gaseous fluid media by itself as well as gaseous fluid media dissolved in liquids. For example, removal of hazardous gasses especially the halogens such as chlorine, bromine, and flourine by passing those gasses through a canister housing a bed of metallic matter is contemplated by, and within the scope of, the present invention. Such an application may provide an alternate method of purifying contaminated air such as in a gas mask or may further be used as an alternative to or in conjunction with conventional scrubbing processes.

The method of the present invention contemplates the use of several different metals as well as mixtures and alloys thereof. It is hypothesized, without being limited to any particular theory of the invention, that the treatment process of the present invention is accomplished by spontaneous oxidation-reduction reactions. Accordingly it is believed that the metal particulate matter should be selected from a group of metals including mixtures and alloys thereof, which are relatively good redox agents relative to the undesirable constituents sought to be treated so as to establish conditions for spontaneous oxidation and reduction reactions between the metal particulate matter and the undesirable constituents when the fluid is in contact with the metal particulate matter.

The relative tendencies of different species to be reduced or oxidized can be predicted from their standard reduction potentials ($E°$ values at 25° C.). By comparing the $E°$ values for different species it is possible to determine whether an oxidation-reduction will spontaneously occur. In accordance with the present invention, metals which are relatively good redox agents relative to the elements or compounds sought to be treated are those metals which are predicted to react spontaneously with such elements and compounds.

For example, chlorine dissolved in water having a pH of approximately 7 and at 25° C. exists as HOCl and ClO$^-$ with HOCl predominating on the acid side and ClO$^-$ predominating on the base side. Assuming for simplicity that ClO$^-$ is the reacting species the following redox reactions are representative of those contemplated by the present invention:

| | |
|---|---|
| Zn(s) → Zn$^{2+}$(aq) + 2e$^-$ | E$^o$ = 0.76 V |
| ClO$^-$(aq) + H$_2$O + 2e$^-$ → Cl$^-$(aq) + 2OH$^-$(aq) | E$^o$ = 0.89 V |
| Zn(s) + ClO$^-$(aq) + H$_2$O → Zn$^{2+}$ + Cl$^-$(aq) + 2OH$^-$(aq) | E = 1.65 V |
| Cu(s) → Cu$^{2+}$(aq) + 2e$^-$ | E$^o$ = −0.34 V |
| ClO$^-$(aq) + H$_2$O + 2e$^-$ → Cl$^-$(aq) + 2OH$^-$(aq) | E$^o$ = 0.89 V |
| Cu(s) + ClO$^-$(aq) + H$_2$O → Cu$^{+2}$(aq) + Cl$^-$ + 2OH$^-$ | E = +0.55 V |

As calculated, both zinc and copper should each react spontaneously with hypochlorite (ClO$^-$) with the zinc theoretically being more spontaneous since it has the more positive potential.

In practice it has been found that a zinc and copper alloy, such as brass is more effective in the removal of dissolved chlorine than is either pure zinc or pure copper or a heterogeneous mixture thereof. In addition to the noted effectiveness of brass, brass is also a preferred metal from the viewpoint of chemical safety. This is especially true in aqueous media since brass does not have the violent reactivity to aqueous fluids as do metals such as pure sodium, potasium, calcium or zinc.

Where brass is the chosen metal, it has been found that washing the brass such as with a hydrochloric acid solution and then rinsing the brass will cleanse the surface of the brass of contaminants, such as iron filings or other foreign matter, which might interfere with the activity of the brass. However, it has additionally been noted that the surface of the brass which is exposed to the atmosphere or to a source fluid such as water may develop a greenish rust which may be a carbonate and/or oxide complex. When the surface itself is physically scraped to remove the greenish rust, the removed rust also shows excellent purifiying tendencies.

Qualitive analysis of water to which chlorine was added and which was treated by being passed through a bed of brass showed that such treating consistently effected a decrease in the amount of chlorine in the water. Set forth below are Examples I and II which describe quantitative anaylsis conducted by independent laboratories of the composition of the brass used to treat the water and of the water treated, respectively, both before and after treatment. Analysis of the brass, as described in Example I below, indicated that passing water through the bed of brass did alter the composition of the brass as might be expected if oxidation-reduction processes were occurring. As shown in Example II below, the independent laboratory analysis of the influent and effluent water passed through the bed of brass did confirm the virtual elimination of the chlorine contained in the influent water.

EXAMPLE I

Water was passed through a cylinder housing a 3 inch by 6 inch bed of 14×30 mesh brass trapped between screens to prevent the escape of the brass. The water passed through the brass bed originated from the Village of Constantine, Michigan water supply which is not chlorinated but which contains dissolved nitrates from approximately 10 to 13 parts per million. Amounts of chlorine, from approximately 2 to 13 parts per million, were introduced into the influent water to test the extent of decrease in the chlorine level. After approximately 51,000 gallons of water had passed through the bed of brass it was observed that the bed had diminished in height about one half inch. A fresh sample of brass from which the bed was composed was analyzed as was a sample of brass taken from the bed after approximately 51,000 gallons of water had passed therethrough.

Elemental composition of these samples was determined by Directly Coupled Plasma-Atomic Emission Spectroscopy using a Beckman Spectraspan VI Spectrometer. Samples were prepared for plasma emission analysis by dissolving 0.1000 grams into 20 milliliters of a 50/50 concentrated nitric acid/distilled water mixture. Total solution weight was then brought to 100.00 grams by the addition of distilled water.

Elemental composition was determined as the average of values obtained from the following emission lines for each element: Copper; 213.598 nm., 233.008 nm.; Iron; 238.204 nm., 259.940 nm., 371.994 nm.; Zinc: 213.856 nm., 206.200 nm., 202.548 nm.; Lead; 405.783 nm., 283.306 nm., 368.348 nm. The results were:

| | BRASS ANALYSIS | |
|---|---|---|
| | BEFORE TREATMENT | AFTER TREATMENT |
| % Copper | 59.2 | 65.0 |
| % Zinc | 35.2 | 27.8 |
| % Lead | 2.5 | 2.5 |
| % Iron | 0.2 | 0.2 |

Emission wavelengths for tin and aluminum were also examined, but these elements could not be detected at the 1 to 1000 sample dilution.

EXAMPLE II

Two sets of samples of influent and effluent water which had passed through the brass bed of Example I after it had been used to treat approximately 51,000 gallons of water were sent to an independent laboratory for analysis. Sample Set A was unchlorinated tap water supplied by the Village of Constantine, Michigan water supply and sample Set B was tap water to which chlorine was added. The results of the analysis follow:

| PARAMETER | UNITS | IN | OUT |
|---|---|---|---|
| SAMPLE SET A | | | |
| Nitrite Nitrogen | mg/l | 10.35 | 9.34 |
| Nitrate & Nitrite | mg/l | <.01 | .01 |
| Organic Nitrogen | mg/l | 10.35 | 9.35 |
| Aluminum (Al) | mg/l | <0.5 | <0.5 |
| Copper (Cu) | mg/l | 0.04 | 0.27 |
| Iron (Fe) | mg/l | <0.05 | 0.34 |
| Potassium (K) | mg/l | 1.00 | 1.47 |
| Sodium (Na) | mg/l | 3.8 | 5.2 |
| Zinc (Zn) | mg/l | 0.12 | 1.3 |
| SAMPLE SET B | | | |
| Chloride | mg/l | 29.5 | 32.0 |
| Chlorine | mg/l | 13.0 | <0.1 |
| Nitrate Nitrogen | mg/l | 11.35 | 10.69 |
| Nitrite Nitrogen | mg/l | <.01 | <0.01 |
| Nitrate & Nitrite | mg/l | 11.35 | 10.69 |
| Aluminum (Al) | mg/l | <0.5 | <0.5 |
| Calcium (Ca) | mg/l | 93.0 | 94 |
| Copper (Cu) | mg/l | 0.05 | .26 |
| Magnesium (Mg) | mg/l | 24.0 | 24.4 |
| Potassium (K) | mg/l | 1.02 | 1.06 |
| Sodium (Na) | mg/l | 17.1 | 17.8 |
| Zinc (Zn) | mg/l | 0.11 | 4.5 |

The preceding Examples are offered to illustrate the method of the present invention and the effect produced thereby and are not intended to limit the general scope thereof. As shown best by the results of Sample Set B of Example II the method of the present invention is effective to remove undesireable contaminants such as dissolved chlorine. The concentration of cations such as zinc and copper cations did increase in the effuent as would be expected if an oxidation-reduction process were taking place. Additionally, it has been observed that influent tap water has a pH of approximately 6.9 while the effluent water passing through the brass bed has a pH of approximately 7.2.

As shown by the results of both Sample Sets A and B of Example II the treatment process also effected a decrease in the level of dissolved nitrates in the water. It has been found that transformation of dissolved nitrates is enhanced and the concentration of the dissolved nitrates is significantly reduced by the present treatment process when the fluid medium is at least slightly acidic such as having a pH of 6.5 or less. Therefore if the fluid to be treated is neutral or above and transformation of dissolved nitrates is desired at an enhanced rate a conventional acid feeder can be incorporated into the water treatment method. Alternatively, if the undesirable constituent is more effectively removed in a basic media a conventional base feeder pretreatment can be used. Where multiple elements or compounds are treated requiring different pH values the water to be treated may be passed through successive beds of metal particulate matter, such as brass, arranged in series with the appropriate conventional acid or base feeders interposed therebetween.

It has further been found that the speed and degree of removal of contaminants is dependent upon the contact time of the fluid with the metal. Accordingly, increasing the contact surface area of the bed such as by using a smaller metal mesh will enhance the speed and degree of removal. Alternatively, or in conjunction therewith, the fluid flow rate could be decreased to allow a longer contact period. It has still further been found that supplying oxygen to the fluid or metal particulate matter such as by bubbling air through the fluid or exposing the bed of metal particulate matter to the atmosphere can enhance the treatment process.

It has been found that the mesh size of the metal particulate matter can very appreciably and still be effective at treating the fluid. For example, typical mesh sizes of the metal particulate matter will range from 4 to 400 mesh based on U.S. Standard screen sizes and although mesh sizes both above and below this range can be utilized mesh sizes from 4 to 30 mesh usually will be preferred for most applications. It will be appreciated that the metal particulate matter can be supplied in other alternate forms such as in aggregate porous bodies made by adhering the particulate matter into porous bodies of any desired shape. Suitable techniques for forming such aggregate porous bodies include sintering and processes wherein a binder is utilized which results in all, or substantially all, of the surface area of the particles freely exposed for contacting fluids to be treated therewith.

It is contemplated that a 20 inch bed of 14×30 mesh brass housed in a cylinder having a 6 inch diameter could accomodate the full pressure water flow rate of a domestic home user and effectively treat influent chlorinated water for many years without replacing the bed of brass.

In addition to chemically treating undesirable constituents the method of the present invention also has application to physically filtering undesirable suspended solids. This aspect of the present invention has particular application to removing suspended iron from water which iron is present in the water naturally, as a result of pretreatment such as by chlorination, or as a result of reaction with the bed of metallic particles utilized in the present method. Where the water is pretreated with chlorine to treat dissolved iron, the present method will not only filter the resulting suspended iron but also will treat the remaining chlorine in the water. The cannister housing the bed of metal particulate matter can be periodically backwashed to remove any filtered matter which has collected in the bed and to declog the bed. However, unlike in other treatment methods such as reverse osmosis and ion-exchange methods, such backwashing does not result in the dumping of concentrated undesirable constituents.

An alternative embodiment of the present invention is a method for purification whereby the water is passed through both a bed of metallic particulate matter such as brass and a conventional treatment process such as reverse osmosis or ion-exchange. This could be especially advantageous due to the fact that semipermeable membranes such as cellulose acetate often used in reverse osmosis treatment methods are often susceptible to degradation by dissolved chlorine as is divinylbenzene which is often used to cross link ion-exchange resins. Utilization of a bed of brass previous to the reverse osmosis membrane or ion-exchanger could substantially lengthen the life of the membrane or resin. Another alternative embodiment of the present invention is a method for purification whereby the water is passed through both a bed of metallic particulate matter such as brass and a bed of filter material and/or filter aid such as sand to enhance filtration of undesirable suspended matter.

It will be appreciated by those skilled in the art that many modifications and variations may be made without departing from the spirit and scope of the present invention. Accordingly the present invention is to be limited in scope only by the appended claims.

What is claimed is:

1. A method of reducing the concentration of undesirable inorganic chlorine which is present in drinkable water, said undesirable inorganic chlorine having a first redox potential, said method comprising passing said water containing said chlorine through a bed of metal particles, said metal particles comprising copper, said particles having a second redox potential such that relative to said first redox potential conditions are established for spontaneous inorganic oxidation and reduction reactions between said chlorine and said metal particles when said water is in contact with said metal particles.

2. The method of claim 1 wherein said metal particles further comprise zinc.

3. The method of claim 2 wherein said metal particles comprise a metal alloy of said copper and said zinc.

4. The method of claim 3 wherein the amount, by weight, of said copper is greater than the amount, by weight, of said zinc in said alloy.

5. The method of claim 3 wherein said alloy is a brass alloy.

6. The method of claim 3 wherein said inorganic chlorine is present as hypochlorous acid or salts thereof.

7. The method of claim 3 wherein said method further comprises the step of adjusting the pH of said water to a desired level prior to passing said water through said bed of metal particles.

8. The method of claim 3 wherein said method further comprises the step of supplying oxygen to said metal particles.

9. The method of claim 3 wherein said method further comprises the step of passing said treated water through a conventional treatment process selected from the group consisting of activated carbon, ion-exchange, and reverse osmosis conventional treatment processes.

10. The method of claim 3 wherein said method further comprises the step of passing said treated water through a filtration medium.

11. The method of claim 10 wherein said filtration medium is sand.

* * * * *